United States Patent
Fang (10) Patent No.: US 10,289,504 B2
(45) Date of Patent: May 14, 2019

(54) ACCESS CONTROL METHOD AND SYSTEM, AND ACCESS POINT

(71) Applicant: Huawei Technologies Co., Ltd., Shenzhen (CN)

(72) Inventor: Yonglong Fang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 321 days.

(21) Appl. No.: 14/962,625

(22) Filed: Dec. 8, 2015

(65) Prior Publication Data

US 2016/0162377 A1 Jun. 9, 2016

(30) Foreign Application Priority Data

Dec. 9, 2014 (CN) .......................... 2014 1 0751346

(51) Int. Cl.
*H04W 88/08* (2009.01)
*G06F 11/20* (2006.01)
(Continued)

(52) U.S. Cl.
CPC .......... *G06F 11/2007* (2013.01); *H04L 45/28* (2013.01); *H04L 61/103* (2013.01);
(Continued)

(58) Field of Classification Search
None
See application file for complete search history.

(56) References Cited

U.S. PATENT DOCUMENTS 7,080,158 B1 * 7/2006 Squire ................ H04L 67/2814
370/389
2003/0202486 A1 * 10/2003 Anton, Jr. ......... H04L 29/12009
370/329
(Continued)

FOREIGN PATENT DOCUMENTS

CN 1830190 A 9/2006
CN 101141493 A 3/2008
(Continued)

OTHER PUBLICATIONS

Foreign Communication From a Counterpart Application, Korean Application No. 10-2015-0174751, Korean Notice of Allowance dated Sep. 27, 2016, 3 pages.
(Continued)

*Primary Examiner* — Gregory B Sefcheck
*Assistant Examiner* — Jenkey Van
(74) *Attorney, Agent, or Firm* — Conley Rose, P.C.

(57) ABSTRACT

An access control method and system and an access point. When a fault occurs in an access controller (AC), an access point (AP) configures a network-layer interface of the AP according to an Internet Protocol (IP) address and a media access control (MAC) address of the AC that are obtained by means of pre-learning, and then the AP routes a received packet to a Web server on a wireless local area network (WLAN) using the configured network-layer interface, where the packet is used by a first station (STA) to request to access an external server. Therefore, interconnection and interworking among wireless local area networks are implemented, and a breakdown of a wireless local area network caused in a centralized network architecture due to occurrence of a fault in an AC is avoided.

9 Claims, 3 Drawing Sheets

(51) Int. Cl.
  *H04L 29/08* (2006.01)
  *H04L 29/12* (2006.01)
  *H04L 12/703* (2013.01)
  *H04L 29/06* (2006.01)
  *H04W 76/10* (2018.01)
  *H04W 12/08* (2009.01)
  *H04L 29/14* (2006.01)
  *H04W 84/12* (2009.01)

(52) U.S. Cl.
  CPC ...... *H04L 61/1511* (2013.01); *H04L 61/6022* (2013.01); *H04L 63/101* (2013.01); *H04L 67/02* (2013.01); *H04L 67/2814* (2013.01); *H04L 69/40* (2013.01); *H04W 12/08* (2013.01); *H04W 76/10* (2018.02); *G06F 2201/85* (2013.01); *H04W 84/12* (2013.01)

(56) References Cited

U.S. PATENT DOCUMENTS

| | | |
|---|---|---|
| 2004/0103275 A1 | 5/2004 | Ji et al. |
| 2005/0152305 A1 | 7/2005 | Ji et al. |
| 2006/0026286 A1* | 2/2006 | Lei ............... G06F 12/0875 709/227 |
| 2007/0113269 A1 | 5/2007 | Zhang |
| 2007/0204051 A1* | 8/2007 | Zhang ............ H04L 29/12066 709/230 |
| 2007/0274321 A1* | 11/2007 | Jonsson ............ H04L 12/2856 370/395.53 |
| 2007/0281683 A1 | 12/2007 | Goulet et al. |
| 2013/0070762 A1* | 3/2013 | Adams ............... H04L 49/70 370/389 |
| 2013/0201978 A1 | 8/2013 | Iyer et al. |
| 2014/0051394 A1 | 2/2014 | Grech et al. |
| 2014/0105007 A1* | 4/2014 | Pathmasuntharam ............... H04L 12/2856 370/230 |
| 2014/0126347 A1* | 5/2014 | Zhou ............... H04W 24/04 370/216 |
| 2014/0280792 A1* | 9/2014 | Sigoure ............... H04L 67/28 709/220 |
| 2014/0282433 A1* | 9/2014 | Eilam ............... G06F 11/3688 717/131 |
| 2014/0359740 A1* | 12/2014 | Yoon ............... H04W 8/02 726/7 |
| 2015/0109912 A1 | 4/2015 | Liu et al. |

FOREIGN PATENT DOCUMENTS

| | | |
|---|---|---|
| CN | 102137109 A | 7/2011 |
| CN | 102394949 A | 3/2012 |
| EP | 2677716 A1 | 12/2013 |
| JP | 2006203640 A | 8/2006 |
| JP | 2012138863 A | 7/2012 |
| KR | 20090007775 A | 1/2009 |
| KR | 20140091913 A | 7/2014 |
| WO | WO 2012/171222 A1 * | 12/2012 |
| WO | 2013071803 A1 | 5/2013 |
| WO | 2013163842 A1 | 11/2013 |
| WO | 2014029443 A1 | 2/2014 |

OTHER PUBLICATIONS

Foreign Communication From a Counterpart Application, Japanese Application No. 2015-239169, Japanese Notice of Allowance dated Jan. 4, 2017, 3 pages.
Foreign Communication From a Counterpart Application, European Application No. 15197448.2, Extended European Search Report dated Apr. 15, 2016, 6 pages.
Foreign Communication From a Counterpart Application, Australian Application No. 2015264883, Australian Notice of Allowance dated Jun. 30, 2016, 2 pages.
Machine Translation and Abstract of Chinese Publication No. CN101141493, Mar. 12, 2008, 12 pages.
Foreign Communication From a Counterpart Application, Chinese Application No. 201410751346.5, Chinese Office Action dated Jun. 5, 2018, 5 pages.

* cited by examiner

ACCESS CONTROL METHOD AND SYSTEM, AND ACCESS POINT

CROSS-REFERENCE TO RELATED APPLICATION

This application claims priority to Chinese Patent Application No. 201410751346.5, filed on Dec. 9, 2014, which is hereby incorporated by reference in its entirety.

TECHNICAL FIELD

Embodiments of the present disclosure relate to communications technologies, and in particular, to an access control method and system, and an access point.

BACKGROUND

Generally, a large-scale wireless local area network (WLAN) uses a centralized network architecture and includes an access controller (AC) and an access point (AP). Except for providing a radio frequency signal, the AP basically does not have management and control functions. Therefore, to implement a function of a wireless local area network, besides an AP, a device AC having management and control functions is also required. Primary functions of the AC are to manage and control all APs on the wireless local area network, and the AC and the APs cooperate to jointly implement the function of the wireless local area network. One AC can control and manage multiple APs. After receiving packets sent by a station (STA), APs transmit the packets of the STA to an AC in a tunneling manner, and the AC performs centralized forwarding processing on these packets.

In a centralized network architecture, an AP needs to be managed by an AC; therefore, if a fault occurs in the AC, the AP cannot work independently, resulting in a breakdown of a wireless local area network.

SUMMARY

Embodiments of the present disclosure provide an access control method and system, and an access point, so as to resolve a technical problem in the prior art that a breakdown of a wireless local area network is caused because an AP device cannot work independently when a fault occurs in an AC.

A first aspect of the present disclosure provides an access control method, which is applied to a WLAN including an AC and an AP, where a first STA establishes an association with the AP after being authenticated by the AC, and the method includes configuring, by the AP, a network-layer interface of the AP according to an Internet Protocol (IP) address and a media access control (MAC) address of the AC when a fault occurs in the AC; and routing, by the AP, a packet received through the configured network-layer interface, to a Web server on the WLAN, where the packet is used by the first STA to request to access an external server.

In a first possible implementation manner of the first aspect, the routing, by the AP, the packet received through the configured network-layer interface, to a Web server on the WLAN, where the packet is used by the first STA to request to access an external server, includes receiving, by the AP, a Hypertext Transfer Protocol (http) request packet sent by the STA, where the http request packet is used to request to acquire data from the external server; and redirecting, by the AP, if determining that the data has been temporarily stored on the Web server, the http request packet to a uniform resource locator (URL) for the data that is temporarily stored on the Web server.

With reference to the first possible implementation manner of the first aspect, in a second possible implementation manner of the first aspect, before the receiving, by the AP, an http request packet sent by the STA, the method further includes receiving, by the AP, a domain name system (DNS) request packet sent by the STA, where the DNS request packet is used to request to obtain, by means of parsing, an IP address of the external server according to a domain name of the external server; using, by the AP, an IP address that does not belong to a network segment of the WLAN as the IP address of the external server; and sending, by the AP, a DNS response packet including the IP address of the external server to the STA.

With reference to the first aspect, in a third possible implementation manner of the first aspect, the method further includes receiving, by the AP, an association request of a second STA, where the association request includes an identifier of the AP; establishing, by the AP, an association with the second STA in an open system authentication manner; acquiring, by the AP, an authorized user list from the AC after the fault in the AC is cleared; and removing, by the AP, the association with the second STA if the second STA is not in the authorized user list.

With reference to the first aspect, the first possible implementation manner of the first aspect, the second possible implementation manner of the first aspect, and the third possible implementation manner of the first aspect, in a fourth possible implementation manner of the first aspect, before the fault occurs in the AC, the method further includes listening, by the AP, to a packet between the first STA and the AC; and learning, by the AP, the packet between the first STA and the AC to obtain the IP address and the MAC address of the AC.

A second aspect of the present disclosure provides an AP, which is disposed on a WLAN including an AC and the AP, where the AP includes a configuration module configured to configure a network-layer interface according to an IP address and a MAC address of the AC when a fault occurs in the AC; and a routing module configured to route a packet received through received through the configured network-layer interface, to a Web server on the WLAN, where the packet is used by a first STA to request to access an external server, and the first STA has been authenticated by the AC and establishes an association with the AP.

In a first possible implementation manner of the second aspect, the routing module includes a receiving unit configured to receive, by the AP, an http request packet sent by the first STA, where the http request packet is used to request to acquire data from the external server; and a redirection unit configured to redirect, if the AP determines that the data has been temporarily stored on the Web server the http request packet to a URL for the data that is temporarily stored on the Web server.

With reference to the first possible implementation manner of the second aspect, in a second possible implementation manner of the second aspect, the AP further includes a domain name parsing module configured to receive a DNS request packet sent by the first STA, where the DNS request packet is used to request to obtain, by means of parsing, an IP address of the external server according to a domain name of the external server; use an IP address that does not belong to a network segment of the WLAN as the IP address of the external server; and send a DNS response packet including the IP address of the external server to the first STA.

With reference to the second aspect, in a third possible implementation manner of the second aspect, the AP further includes an association module configured to receive an association request of a second STA, where the association request includes an identifier of the AP; establish an association with the second STA in an open system authentication manner; acquire an authorized user list from the AC after the fault in the AC is cleared; and remove the association with the second STA if the second STA is not in the authorized user list.

With reference to the second aspect, the first possible implementation manner of the second aspect, the second possible implementation manner of the second aspect, and the third possible implementation manner of the second aspect, in a fourth possible implementation manner of the second aspect, the AP further includes a learning module configured to, before the fault occurs in the AC, listen to a packet between the first STA and the AC; and learn the packet between the first STA and the AC to obtain the IP address and the MAC address of the AC.

A third aspect of the present disclosure provides an access control system, including an AC and the AP that is described above.

By means of the access control method and system, and the access point provided in the embodiments of the present disclosure, when a fault occurs in an AC, an AP configures a network-layer interface of the AP according to an IP address and a MAC address of the AC that are obtained by means of pre-learning, and then the AP routes a received packet to a Web server on a WLAN using the configured network-layer interface, where the packet is used by a first STA to request to access an external server. Therefore, interconnection and interworking among wireless local area networks are implemented, and a breakdown of a wireless local area network caused in a centralized network architecture due to occurrence of a fault in an AC is avoided.

BRIEF DESCRIPTION OF DRAWINGS

To describe the technical solutions in the embodiments of the present disclosure or in the prior art more clearly, the following briefly introduces the accompanying drawings required for describing the embodiments. The accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

Figure 1:
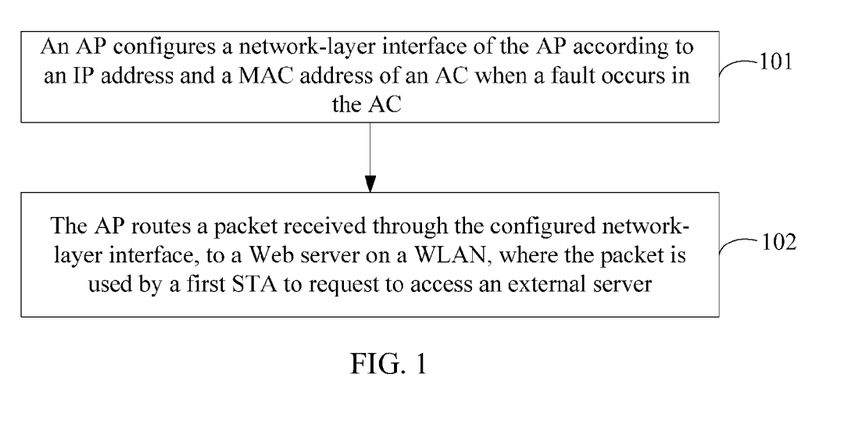
FIG. 1 is a schematic flowchart of an access control method according to an embodiment of the present disclosure.

FIG. 1 is a schematic flowchart of an access control method according to an embodiment of the present disclosure. The method provided in this embodiment is executed by an AP. The method is applied to a WLAN including an AC and the AP, and a first STA establishes an association with the AP after being authenticated by the AC. The access control method provided in this embodiment may include the following steps.

101: The AP configures a network-layer interface of the AP according to an IP address and a MAC address of the AC when a fault occurs in the AC.

More specifically, when interaction is performed between the first STA and the AC, the AP listens to a packet between the first STA and the AC and learns the packet to obtain the IP address and the MAC address of the AC. More specifically, a Dynamic Host Configuration Protocol (DHCP) packet of the first STA is listened to, an IP address of a gateway, namely the IP address of the AC, and a network segment to which the IP address belongs are obtained by learning a DHCP acknowledgement (ACK) packet, the network segment is used as a network segment of the WLAN, and the AP records the IP address of the AC that is obtained by means of learning. Then, the AP further obtains, by means of learning, the MAC address of the AC according to the IP address of the AC that is obtained by means of learning. More specifically, the AP listens to an ARP packet sent by the first STA, to determine whether the IP address of the AC is matched with an IP address in the Address Resolution Protocol (ARP) packet, and if the IP address of the AC matches the IP in the ARP packet, a MAC address of the gateway, namely the MAC address of the AC, in the ARP packet is recorded. Therefore, when a fault occurs in the AC, the AP configures the network-layer interface of the AP using the IP address and the MAC address of the AC that are obtained by means of learning, so as to enable the network-layer interface. A network layer refers to a third layer of an open system interconnect (OSI) reference model. The network-layer interface is configured to perform packet routing on the network layer.

102: The AP routes a packet to a Web server on the WLAN when receiving the packet through the configured network-layer interface, where the packet is used by the first STA to request to access an external server.

More specifically, the AP receives an http request packet sent by the first STA, where the http request packet is used to request to acquire data from the external server; if determining that the data has been temporarily stored on the Web server, the AP redirects the http request packet to a URL for the data that is temporarily stored on the Web server.

In this embodiment, when a fault occurs in an AC, an AP configures a network-layer interface of the AP according to an IP address and a MAC address of the AC that are obtained by means of pre-learning, and then the AP routes a received packet to a Web server on a WLAN using the configured network-layer interface, where the packet is used by a first STA to request to access an external server. Therefore, interconnection and interworking among wireless local area networks are implemented, and a breakdown of a wireless local area network caused in a centralized network architecture due to occurrence of a fault in an AC is avoided.

Figure 2:
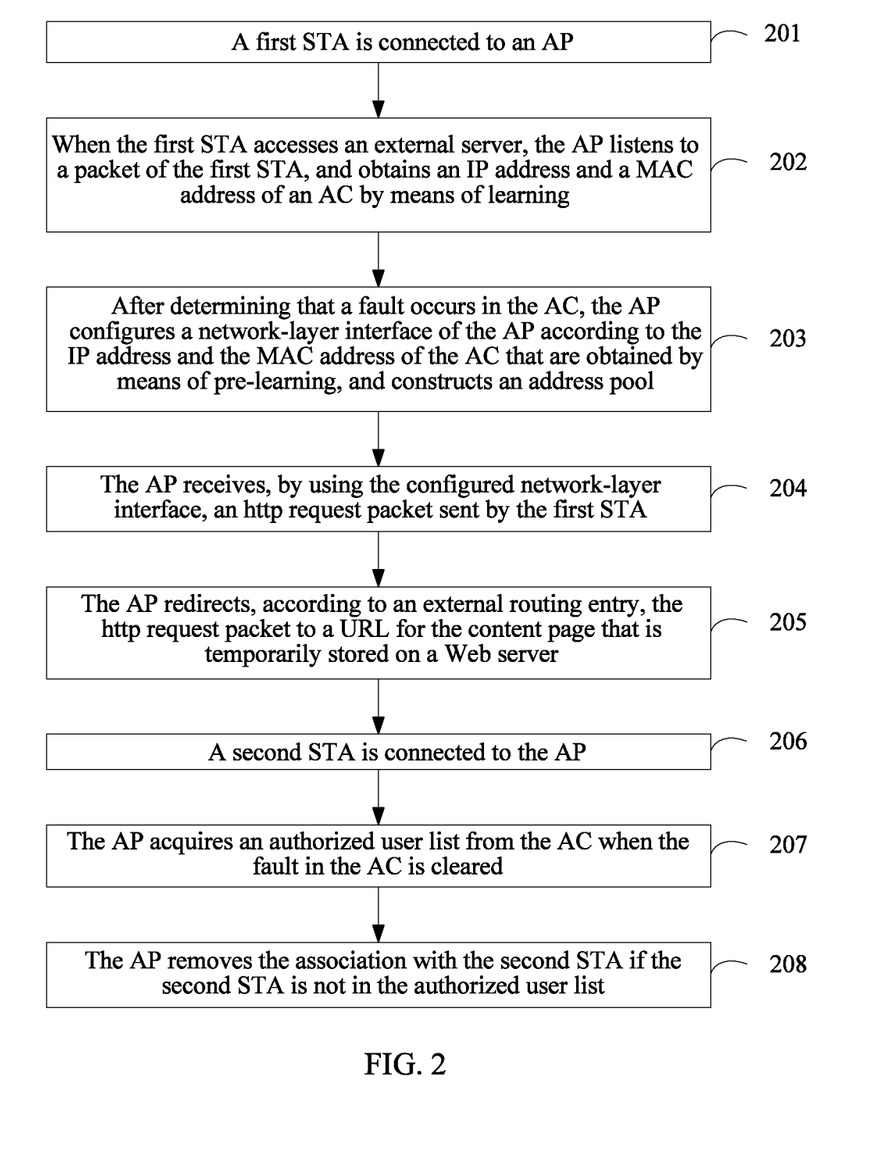
FIG. 2 is a schematic flowchart of another access control method according to an embodiment of the present disclosure.

FIG. 2 is a schematic flowchart of another access control method according to an embodiment of the present disclosure. The method provided in this embodiment is executed by an AP. The method is applied to a WLAN including an AC and the AP. The method may include the following steps.

201: A first STA is connected to the AP.

Optionally, the first STA performs active scanning to discover the AP, and the first STA interacts with the AC using the AP, to execute an authentication process on a radio link; if the AC confirms that the first STA is authenticated, the AC adds the first STA to an authorized user list and instructs the AP to associate the first STA; and the AP negotiates, according to the instruction of the AC, with the first STA for a service parameter of the radio link to complete establishment of the radio link.

The AP maintains a user list, where the user list includes an identifier of the STA that has been connected to the AP, and in the user list, the first STA may be marked as a managed user.

202: When the first STA accesses an external server, the AP listens to a packet of the first STA, and obtains an IP address and a MAC address of the AC by means of learning.

More specifically, when accessing the external server, the first STA needs to send a packet that is used to request to access the external server to the AC using the AP, and then the AC performs forwarding processing on the packet. In this process, the AP listens to the packet that is sent by the first STA and that is used to request to access the external server, thereby obtaining, by means of learning, the IP address and the MAC address of the AC. More specifically, the AP listens to a DHCP packet of the STA, obtains, by learning a DHCP ACK packet, an IP of a gateway of the WLAN, namely the IP address of the AC, and a network segment to which the IP belongs, uses the network segment as a network segment of the WLAN, and records the IP of the AC that is obtained by means of learning. Then, the AP further obtains, by means of learning, the MAC address of the AC according to the IP of the AC that is obtained by means of learning. More specifically, an ARP packet sent by the first STA is listened to, the IP of the AC is matched with an IP in the ARP packet, and if the IP address of the AC matches the IP in the ARP packet, a MAC address of the gateway, namely the MAC address of the AC, in the ARP packet is recorded.

203: After determining that a fault occurs in the AC, the AP configures a network-layer interface of the AP according to the IP address and the MAC address of the AC that are obtained by means of pre-learning, and constructs an address pool.

More specifically, after determining that a fault occurs in the AC, the AP configures the network-layer interface according to the IP address and the MAC address of the AC that are obtained by means of pre-learning, and constructs the address pool according to the network segment of the WLAN determined in the learning process, so as to use the address pool to allocate an IP address to the STA connected to the AP.

204: The AP receives, using the configured network-layer interface, an http request packet sent by the first STA.

The http request packet is used to request to acquire data, such as video content or a page, from the external server.

More specifically, an http agent may be deployed inside the AP in advance; when needing to access the external server, the first STA first sends a synchronous (SYN) packet for requesting to access the external server; after receiving the SYN packet using the configured network-layer interface, the http agent simulates the external server to complete a Transmission Control Protocol (TCP) handshake with the first STA and to establish a TCP connection between the http agent and the first STA. The http agent receives, through the configured network-layer interface, the http request packet sent by the first STA on the TCP connection.

205: The AP redirects, according to an external routing entry, the http request packet to a URL for a content page that is temporarily stored on a Web server.

More specifically, a Web server may be deployed inside the WLAN in advance, a content page on the external server may be temporarily stored on the Web server in advance, where the content page is accessed frequently by the first STA, and the page content may relate to content, such as news, videos, and games, in which a user is interested. After receiving the http request packet sent by the first STA, the http agent deployed inside the AP redirects, according to an external routing entry in a routing table, the http request packet to the URL for the content page that is temporarily stored on the Web server, that is, returns, to the first STA, an http redirection packet carrying the URL; such that, after receiving the http redirection packet, the first STA closes the TCP connection between the http agent and the first STA, establishes a new connection to the Web server, and further acquires, according to the URL, using the new connection, the content page that is temporarily stored on the Web server.

Further, the http request packet needs to include an IP address of the external server, and a DNS process further needs to be performed if the first STA learns of only a domain name of the external server, so as to acquire the IP address of the external server. More specifically, the AP receives a DNS request packet sent by the first STA, where the DNS request packet is used to request to obtain, by means of parsing, the IP address of the external server according to the domain name of the external server; and then, the AP uses an IP address that does not belong to the network segment of the WLAN as the IP address of the external server, that is, performs DNS spoofing; and sends a DNS response packet including the IP address of the external server to the first STA.

It can be seen that, when the first STA requests to acquire the content page on the external server, redirection is performed using the AP, such that the first STA acquires, according to the URL that is redirected to, the content page from the Web server deployed inside the WLAN, which avoids a case in which the first STA cannot acquire the content page on the external server because of a fault in the AC.

206: A second STA is connected to the AP.

More specifically, the AP receives an association request sent by the second STA, and the AP establishes an association with the second STA in an open system authentication manner, namely in a manner in which simplified authentication or even no authentication is performed; the establishing an association includes allocating, by the AP, an idle IP to the second STA according to the foregoing pre-constructed address pool, and establishing, by the second STA, a radio link with the AP using the idle IP, so as to implement the association between the second STA and the AP.

Further, after the second STA is connected to the AP, and when the second STA requests to access the external server, for a processing process, executed by the AP, of a received http request packet sent by the second STA, reference may be made to processing performed by the AP on the http request packet sent by the first STA in step 204 and step 205, and a processing process is not repeatedly described herein.

It can be seen that, for the first STA of which an association procedure has been completed by the AC before a fault occurs in the AC, after the fault occurs in the AC, the AP configures the network-layer interface of the AP according to the IP address and the MAC address of the AC that are obtained by means of pre-learning, and then the AP routes the received packet of the first STA to the Web server on the WLAN using the configured network-layer interface; therefore, the first STA can implement a process of accessing the WLAN. However, for the second STA that needs to be connected to the WLAN after a fault occurs in the AC, an association procedure is completed by the AP in this embodiment; such that, the second STA is connected to the WLAN after a fault occurs in the AC. In the association process, the AP performs simplified authentication or even performs no authentication on the second STA, and allocates an idle IP to the second STA according to the pre-constructed address pool, such that the second STA may be associated with the AP using the idle IP.

Further, the AP may mark, in the user list, the second STA as an unmanaged user, so as to indicate that the second STA is a user that is connected after a fault occurs in the AC and that is not authenticated by the AC.

207: The AP acquires an authorized user list from the AC when the fault in the AC is cleared.

More specifically, the AP disables a DHCP service, a gateway agent, and DNS spoofing when the fault in the AC is cleared. In addition, the AP acquires the authorized user list from the AC, where the authorized user list is used to record an identifier of a STA authenticated by the AC.

208: The AP removes the association with the second STA if the second STA is not in the authorized user list.

More specifically, the AP removes the association with the second STA if the second STA is not in the authorized user list; or the AP changes the second STA to a managed state in the user list if the second STA is within the authorized user list.

In this embodiment, when a fault occurs in an AC, an AP configures a network-layer interface of the AP according to an IP address and a MAC address of the AC that are obtained by means of pre-learning, and then the AP routes a received packet to a Web server on a WLAN using the configured network-layer interface, where the packet is used by a first STA to request to access an external server. Therefore, interconnection and interworking among wireless local area networks are implemented, and a breakdown of a wireless local area network caused in a centralized network architecture due to occurrence of a fault in an AC is avoided. In addition, after the fault occurs in the AC, a second STA is allowed to be connected, and after the fault in the AC is cleared, an authorized user list is acquired from the AC, and then authentication is performed on the second STA, which resolves a problem that a STA cannot be connected when a fault occurs in an AC.

Figure 3:
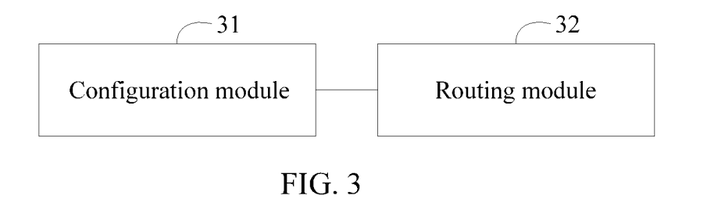
FIG. 3 is a schematic structural diagram of an AP according to an embodiment of the present disclosure.

FIG. 3 is a schematic structural diagram of an AP according to an embodiment of the present disclosure. The AP is disposed on a WLAN including an AC and the AP.

As shown in FIG. 3, the AP includes a configuration module 31 and a routing module 32.

The configuration module 31 is configured to configure a network-layer interface according to an IP address and a MAC address of the AC when a fault occurs in the AC.

More specifically, when interaction is performed between a first STA and the AC, the AP listens to a packet between the first STA and the AC and learns the packet to obtain the IP address and the MAC address of the AC. More specifically, a DHCP packet of the STA is listened to, an IP address of a gateway, namely the IP address of the AC, and a network segment to which the IP address belongs are obtained by learning a DHCP ACK packet, the network segment is used as a network segment of the WLAN, and the AP records the IP address of the AC that is obtained by means of learning. Then, the AP further obtains, by means of learning, the MAC address of the AC according to the IP address of the AC that is obtained by means of learning. More specifically, an ARP packet sent by the STA is listened to, the IP address of the AC is matched with an IP address in the ARP packet, and if the IP address of the AC matches the IP address in the ARP packet, a MAC address of the gateway, namely the MAC address of the AC, in the ARP packet is recorded. Therefore, when a fault occurs in the AC, the AP configures the network-layer interface of the AP using the IP address and the MAC address of the AC that are obtained by means of learning, so as to enable the network-layer interface.

The routing module 32 is connected to the configuration module 31 and is configured to route a packet to a Web server on the WLAN when receiving the packet through the configured network-layer interface, where the packet is used by the first STA to request to access an external server.

The first STA has been authenticated by the AC and establishes an association with the AP. There may be at least one first STA, and the first STA may exist in a form of a personal computer, a personal assistant, a mobile terminal, or the like.

The AP provided in this embodiment of the present disclosure is configured to execute the access control method shown in FIG. 1. For functions of the modules of the AP, refer to corresponding content in this embodiment of the access control method corresponding to FIG. 1, and details are not repeatedly described in this embodiment.

In this embodiment, when a fault occurs in an AC, an AP configures a network-layer interface of the AP according to an IP address and a MAC address of the AC that are obtained by means of pre-learning, and then the AP routes a received packet to a Web server on a WLAN using the configured network-layer interface, where the packet is used by a first STA to request to access an external server. Therefore, interconnection and interworking among wireless local area networks are implemented, and a breakdown of a wireless local area network caused in a centralized network architecture due to occurrence of a fault in an AC is avoided.

Figure 4:
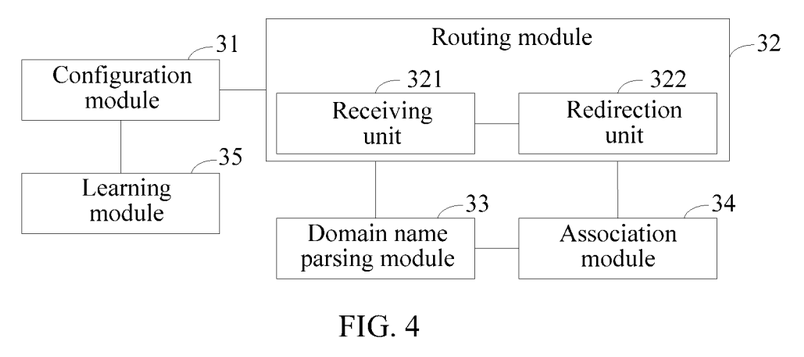
FIG. 4 is a schematic structural diagram of another AP according to an embodiment of the present disclosure.

FIG. 4 is a schematic structural diagram of another AP according to an embodiment of the present disclosure. Based on the previous embodiment, the routing module 32 further includes a receiving unit 321 and a redirection unit 322.

The receiving unit 321 is configured to receive an http request packet sent by the first STA.

The http request packet is used to request to acquire data from the external server.

More specifically, when needing to access the external server, the first STA first sends an SYN packet for requesting to access the external server; after receiving the SYN packet, the receiving unit 321 simulates the external server to complete a TCP handshake with the first STA and to establish a TCP connection between the AP and the first STA. The receiving unit 321 receives, through the configured network-layer interface, the http request packet sent by the first STA on the TCP connection.

The redirection unit 322 is connected to the receiving unit 321 and is configured to redirect, if the AP determines that the data has been temporarily stored on the Web server, the http request packet to a URL for the data that is temporarily stored on the Web server.

Further, the AP further includes a domain name parsing module 33.

The domain name parsing module 33 is connected to the routing module 32 and is configured to receive a DNS request packet sent by the first STA; use an IP address that does not belong to a network segment of the WLAN as the IP address of the external server; and send a DNS response packet including the IP address of the external server to the first STA.

The DNS request packet is used to request to obtain, by means of parsing, the IP address of the external server according to a domain name of the external server.

Further, the AP further includes an association module 34.

The association module 34 is connected to the routing module 32 and is configured to receive an association request of a second STA, where the association request includes an identifier of the AP; establish an association with the second STA in an open system authentication manner; acquire an authorized user list from the AC after the fault in the AC is cleared; and remove the association with the second STA if the second STA is not in the authorized user list.

Further, the AP further includes a learning module 35.

The learning module 35 is connected to the configuration module 31 and is configured to, before the fault occurs in the AC, listen to a packet between the first STA and the AC; and learn the packet between the first STA and the AC to obtain an IP address and a MAC address of the AC.

The AP provided in this embodiment of the present disclosure is configured to execute the access control method shown in FIG. 2. For functions of the modules of the AP, reference is made to corresponding content in this embodiment of the access control method corresponding to FIG. 2, and details are not repeatedly described in this embodiment.

In this embodiment, when a fault occurs in an AC, an AP configures a network-layer interface of the AP according to an IP address and a MAC address of the AC that are obtained by means of pre-learning, and then the AP routes a received packet to a Web server on a WLAN using the configured network-layer interface, where the packet is used by a first STA to request to access an external server. Therefore, interconnection and interworking among wireless local area networks are implemented, and a breakdown of a wireless local area network caused in a centralized network architecture due to occurrence of a fault in an AC is avoided. In addition, after the fault occurs in the AC, a second STA is allowed to be connected, and after the fault in the AC is cleared, an authorized user list is acquired from the AC, and then authentication is performed on the second STA, which resolves a problem that a STA cannot be connected when a fault occurs in an AC.

Figure 5:
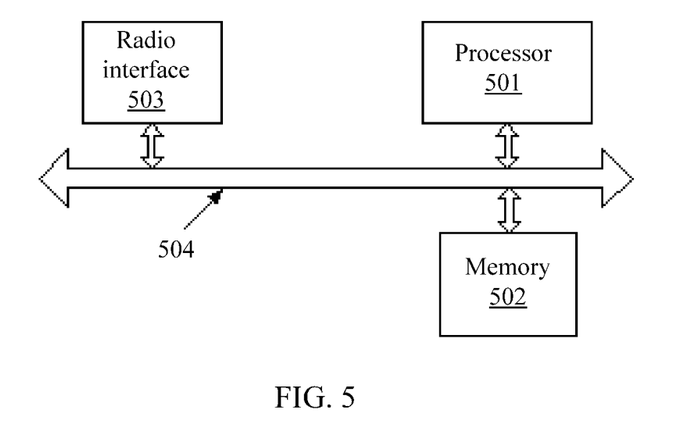
FIG. 5 is a schematic structural diagram of still another AP according to an embodiment of the present disclosure.

FIG. 5 is a schematic structural diagram of still another AP according to an embodiment of the present disclosure. The AP includes a processor 501, a memory 502, a radio interface 503, and a bus 504.

The processor 501, the memory 502, and the radio interface 503 are connected to one another by the bus 504. The bus 504 may be a peripheral component interconnect (PCI) bus, an extended industry standard architecture (EISA) bus, or the like. The bus 504 may be an address bus, a data bus, a control bus, or the like. For ease of description, the bus 504 is represented using only a bold line in FIG. 5, but it does not indicate that there is only one bus or one type of bus.

The memory 502 is configured to store a program. The program may include program code, where the program code includes a computer operation instruction. The memory 502 may include a random access memory (RAM), or may include a non-volatile memory, for example, at least one magnetic disk memory.

The processor 501 executes the program stored by the memory 502, to implement an access control method provided in the embodiments of the present disclosure, where the method includes configuring, by the AP, a network-layer interface of the AP according to an IP address and a MAC address of the AC when a fault occurs in the AC; and routing, by the AP, a packet to a Web server on a WLAN when receiving the packet using the configured network-layer interface, where the packet is used by a first STA to request to access an external server.

More specifically, the AP receives an http request packet sent by the first STA, where the http request packet is used to request to acquire data from the external server; and redirects, if the AP determines that the data has been temporarily stored on the Web server, the http request packet to a URL for the data that is temporarily stored on the Web server.

Further, the method may further include receiving, by the AP, an association request of a second STA, where the association request includes an identifier of the AP; establishing, by the AP, an association with the second STA in an open system authentication manner; acquiring, by the AP, an authorized user list from the AC after the fault in the AC is cleared; and removing, by the AP, the association with the second STA if the second STA is not in the authorized user list.

Further, before the fault occurs in the AC, the method may further include listening, by the AP, to a packet between the first STA and the AC; and learning, by the AP, the packet between the first STA and the AC to obtain the IP address and the MAC address of the AC.

The processor 501 may be a general purpose processor, including a central processing unit (CPU), a network processor NP), and the like; or may be a digital signal processor (DSP), an application-specific integrated circuit (ASIC), a field programmable gate array (FPGA) or another programmable logical device, a discrete gate or transistor logic device, or a discrete hardware component.

Figure 6:
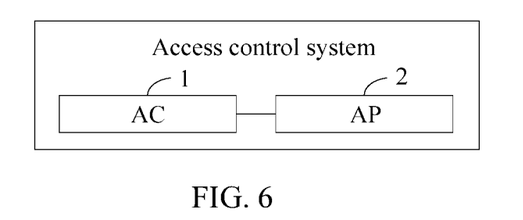
FIG. 6 is a schematic structural diagram of an access control system according to an embodiment of the present disclosure.

An embodiment of the present disclosure further provides an access control system, where the access control system is applied to a WLAN including an AC 1 and an AP 2. A first STA establishes an association with the AP 2 after being authenticated by the AC 1. FIG. 6 is a schematic structural diagram of the access control system according to this embodiment of the present disclosure, where the access control system includes the AC 1 and the AP 2. For a structure and a working principle of the AP 2, reference may be made to the description in the embodiments of the present disclosure in FIG. 3 to FIG. 5.

The AC 1 is configured to provide an authorized user list for the AP 2 when a fault is cleared, where the authorized user list is used to record an identifier of a STA authenticated by the AC 1.

In this embodiment, when a fault occurs in an AC, an AP configures a network-layer interface of the AP according to an IP address and a MAC address of the AC that are obtained by means of pre-learning, and then the AP routes a received packet to a Web server on a WLAN using the configured network-layer interface, where the packet is used by a first STA to request to access an external server. Therefore, interconnection and interworking within wireless local area network are implemented, and a breakdown of a wireless local area network caused in a centralized network architecture due to occurrence of a fault in an AC is avoided.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a read-only memory (ROM), a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. An access control method, which is applied to a wireless local area network (WLAN) comprising an access controller (AC) and an access point (AP), wherein a first station (STA) establishes an association with the AP after being authenticated by the AC, the method comprising:
   before a fault occurs in the AC, listening, by the AP, to a first packet between the first STA and the AC, and learning, by the AP, an Internet Protocol (IP) address and a media access control (MAC) address of the AC based, at least in part, on the first packet between the first STA and the AC;
   configuring, by the AP, a network-layer interface of the AP with the IP address and the MAC address of the AC when the fault occurs in the AC; and
   routing, by the AP, a second packet received from the first STA through the network-layer interface to a Web server on the WLAN, wherein the packet comprises a request to access an external server,
   wherein routing the second packet to the Web server comprises: receiving, by the AP, a Hypertext Transfer Protocol (http) request packet from the first STA, wherein the http request packet comprises a request to acquire data from the external server; and redirecting, by the AP, the http request packet to a uniform resource locator (URL) for the data when the data is temporarily stored on the Web server.

2. The method of claim 1, wherein before receiving the http request packet, the method further comprises: receiving, by the AP, a domain name system (DNS) request packet from the first STA, wherein the DNS request packet comprises a request to obtain an IP address of the external server based on a domain name of the external server; using, by the AP, an IP address that does not belong to a network segment of the WLAN as the IP address of the external server; and sending, by the AP, a DNS response packet comprising the IP address of the external server to the first STA.

3. The method of claim 1 further comprising:
   receiving, by the AP, an association request of a second STA, wherein the association request comprises an identifier of the AP;
   establishing, by the AP, an association with the second STA in an open system authentication manner;
   acquiring, by the AP, an authorized user list from the AC after the fault in the AC is cleared; and
   removing, by the AP, the association with the second STA when the second STA is not in the authorized user list.

4. An access point (AP), disposed on a wireless local area network (WLAN) comprising an access controller (AC) and the AP, wherein the AP comprises:
   a processor configured to:
   before a fault occurs in the AC, listen to a first packet between the first STA and the AC, and learn an Internet Protocol (IP) address and a media access control (MAC) address of the AC based, at least in part, on the first packet between the first STA and the AC;
   configure a network-layer interface with the IP address and the MAC address of the AC when the fault occurs in the AC; and
   route a second packet received from a first station (STA) through the network-layer interface to a Web server on the WLAN, wherein the packet comprises a request to access an external server, and wherein the first STA has been authenticated by the AC and establishes an association with the AP,
   wherein route the second packet to the Web server comprises: receive a Hypertext Transfer Protocol (http) request packet from the first STA, wherein the http request packet comprises a request to acquire data from the external server; and redirect the http request packet to a uniform resource locator (URL) for the data, when the data is temporarily stored on the Web server.

5. The AP of claim 4, wherein the processor is further configured to: receive a domain name system (DNS) request packet from the first STA, wherein the DNS request packet comprises a request to obtain an IP address of the external server based on a domain name of the external server; use an IP address that does not belong to a network segment of the WLAN as the IP address of the external server; and send a DNS response packet comprising the IP address of the external server to the first STA.

6. The AP of claim 4, wherein the processor is further configured to:
   receive an association request of a second STA, wherein the association request comprises an identifier of the AP;
   establish an association with the second STA in an open system authentication manner;
   acquire an authorized user list from the AC after the fault in the AC is cleared; and
   remove the association with the second STA when the second STA is not in the authorized user list.

7. An access control system, comprising:
   an access controller (AC); and
   an access point (AP) configured to:
   establish an association with a first station (STA) after the first STA is authenticated by the AC;
   before a fault occurs in the AC, the AP is further configured to: listen to a first packet between the first STA and the AC, and learn an Internet Protocol (IP) address and a media access control (MAC) address of the AC based, at least in part, on the first packet between the first STA and the AC;
   configure a network-layer interface of the AP with the IP address and the MAC address of the AC when the fault occurs in the AC; and
   route a second packet received from the first STA through the network-layer interface to a Web server on the WLAN, wherein the packet comprises a request to access an external server,
   wherein route the second packet to the Web server comprises: receive a Hypertext Transfer Protocol (http) request packet from the first STA, wherein the http request packet comprises a request to acquire data from the external server; and redirect the http request packet to a uniform resource locator (URL) for the data when the data is temporarily stored on the Web server.

8. The access control system of claim 7, wherein before receiving the http request packet, the AP is further configured to: receive a domain name system (DNS) request packet from the first STA, wherein the DNS request packet comprises a request to obtain an IP address of the external server based on a domain name of the external server; use an IP address that does not belong to a network segment of the WLAN as the IP address of the external server; and send a DNS response packet comprising the IP address of the external server to the first STA.

9. The access control system of claim 7, wherein the AP is further configured to:
  receive an association request of a second STA, wherein the association request comprises an identifier of the AP;
  establish an association with the second STA in an open system authentication manner;
  acquire an authorized user list from the AC after the fault in the AC is cleared; and
  remove the association with the second STA when the second STA is not in the authorized user list.

\* \* \* \* \*